(12) United States Patent
Hsu et al.

(10) Patent No.: US 10,945,091 B2
(45) Date of Patent: *Mar. 9, 2021

(54) METHODS AND SYSTEMS FOR COMMUNICATION MANAGEMENT

(71) Applicant: COMCAST CABLE COMMUNICATIONS MANAGEMENT, LLC, Philadelphia, PA (US)

(72) Inventors: Chun Hsu, Issaquah, WA (US); Michael Horwitz, Seattle, WA (US); Chris Orogvany, Seattle, WA (US); Alfred Stappenbeck, Edmonds, WA (US)

(73) Assignee: COMCAST CABLE COMMUNICATIONS MANAGEMENT, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/431,467

(22) Filed: Jun. 4, 2019

(65) Prior Publication Data

US 2020/0128352 A1    Apr. 23, 2020

Related U.S. Application Data

(63) Continuation of application No. 14/529,737, filed on Oct. 31, 2014, now Pat. No. 10,362,434.

(51) Int. Cl.
*H04W 4/00* (2018.01)
*H04W 76/18* (2018.01)
*H04W 24/00* (2009.01)
*H04W 28/18* (2009.01)
*H04L 29/08* (2006.01)
*H04L 29/06* (2006.01)

(52) U.S. Cl.
CPC ............ *H04W 4/00* (2013.01); *H04W 24/00* (2013.01); *H04W 76/18* (2018.02); *H04L 67/10* (2013.01); *H04L 67/145* (2013.01); *H04L 69/28* (2013.01); *H04W 28/18* (2013.01)

(58) Field of Classification Search
CPC ........ H04W 4/00; H04W 24/00; H04W 28/18
See application file for complete search history.

(56) References Cited

U.S. PATENT DOCUMENTS

| | | | |
|---|---|---|---|
| 8,307,031 B1 | 11/2012 | Grieve | |
| 8,385,354 B2 * | 2/2013 | Nukala | ................ G06F 9/524 370/395.7 |
| 10,362,434 B2 | 7/2019 | Hsu et al. | |
| 2004/0249921 A1 | 12/2004 | Yamamoto | |
| 2008/0104259 A1 | 5/2008 | LeFevre et al. | |
| 2010/0094985 A1 | 4/2010 | Abu-Samaha et al. | |

(Continued)

OTHER PUBLICATIONS

U.S. Appl. No. 14/529,737, filed Oct. 31, 2014, Chen Hsu.

*Primary Examiner* — Jamal Javaid
*Assistant Examiner* — Ryan C Kavleski
(74) *Attorney, Agent, or Firm* — Ballard Spahr LLP

(57) ABSTRACT

Methods and systems for communication management are disclosed. A computing device may receive a computing request. The computing device may determine a timeout parameter associated with the computing request. A notification may be sent if the timeout parameter is predicted to be exceeded or if the timeout parameter is exceeded.

26 Claims, 6 Drawing Sheets

(56) References Cited

U.S. PATENT DOCUMENTS

2013/0103977 A1    4/2013  Zimmermann
2014/0136659 A1    5/2014  Fonti et al.
2016/0128059 A1    5/2016  Hsu et al.

* cited by examiner

METHODS AND SYSTEMS FOR COMMUNICATION MANAGEMENT

CROSS REFERENCE TO RELATED PATENT APPLICATION

This application is a continuation of U.S. application Ser. No. 14/529,737 filed Oct. 31, 2014, which is herein incorporated by reference in its entirety.

BACKGROUND

Current network transactions have time restrictions. Network communications requests, such as HTTP requests, can be terminated if the time needed to process the request is beyond a predefined timeout parameter. The termination can leave communication requestors unsure of whether terminated network transactions actually went through. These and other shortcomings are addressed in the present disclosure.

SUMMARY

It is to be understood that both the following summary and the following detailed description are exemplary and explanatory only and are not restrictive, as claimed. Provided are methods and systems for communication management. Services and/or clients in a system can specify or determine timeout parameters in communication requests. A timeout parameter can be a time allocated to process a request and/or fulfill a task associated with a request. A notification can be sent when time to process a request or fulfill a task is predicted to exceed a respective timeout parameter.

In an aspect, when a client transmits a request to a service, or when one service transmits a request to another service, the client or the service that transmits the request can specify a timeout parameter in the request. The service that receives the request can determine a timeout parameter associated with the request. For example, the timeout parameter can comprise a time limit to complete a task. The service that receives the request can identify a first task based on the task in the request and associate a second timeout parameter with the first task. For example, the service that receives the request can subtract an overhead time from the first timeout parameter to derive a second timeout parameter. In an aspect, the service that receives the request can delegate one or more other services to process the first task. For example, the one or more other services can complete one or more portions of the first task. Each of the one or more other services can be allocated a respective timeout parameter (e.g., a third timeout parameter, a fourth timeout parameter, etc.). A notification can be sent if one or more timeout parameters (e.g., first timeout parameter, second timeout parameter, third timeout parameter, fourth timeout parameter) are predicted to be exceeded. The notification can be sent to the client or the service that initiates the request.

An example method can comprise receiving a first request at a first device. A first timeout parameter associated with the first request can be determined. A first task can be identified based on the first request. A second timeout parameter can be associated with the first task based on the first timeout parameter and the first task. The second timeout parameter can be processed based on the second timeout parameter.

Another example method can comprise receiving a first request and a first timeout parameter associated with the first request. A time allocation for processing a first portion of the first request can be determined. A second timeout parameter can be determined by subtracting at least the time allocation from the first timeout parameter. A second request to perform a second portion of the first request can be sent. In an aspect, the second request can be sent with the second timeout parameter.

Another example method can comprise sending a first request with a first timeout parameter from a first device to a second device and receiving, at the first device, from the second device, a notification indicating a timeout prediction. The second device can be configured to send the notification before the first timeout parameter is exceeded. A second timeout parameter can be determined, at the first device, in response to receiving the notification, and a second request comprising the second timeout parameter can be sent.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
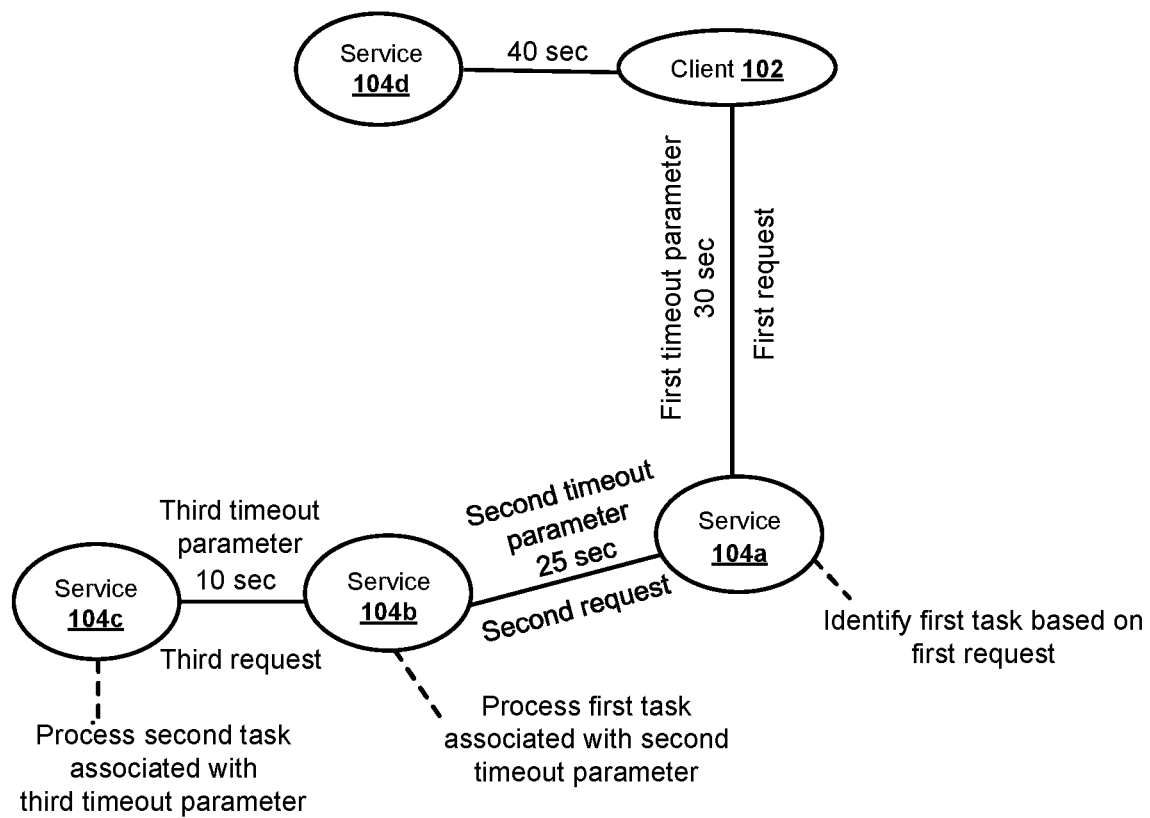
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded to a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded to a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for communication management are disclosed. Services and/or clients in a system can specify or determine one or more timeout parameters in communication requests. A timeout parameter can comprise an amount of time allocated to process a request and/or otherwise fulfill a task associated with a request. A notification can be provided when time to process a request or fulfill a task is predicted to exceed a respective timeout parameter. As an example, when a client transmits a request to a service, or when one service transmits a request to another service, the client or the service that transmits the request can specify a timeout parameter in the request. The service that receives the request can determine a timeout parameter associated with the request. For example, the timeout parameter can comprise a time limit to complete a task. The service that receives the request can identify a first task based on the task in the request and associate a second timeout parameter with the first task. For example, the service that receives the request can subtract an overhead time from the first timeout parameter to derive a second timeout parameter. In an aspect, the service that receives the request can delegate one or more other services to process the first task. For example, the one or more other services can complete one or more portions of the first task. Each of the one or more other services can be allocated a respective timeout parameter (e.g., a third timeout parameter, a fourth timeout parameter). A notification can be sent if one or more timeout parameters (e.g., second timeout parameter, third timeout parameter, fourth timeout parameter) are predicted to be exceeded. The notification can be sent to the client or the service that initiates the request.

As another example, the provided methods and system can comprise a client informing a service (e.g., device running a service) of a time limit (e.g., 30 seconds) to complete a transaction. The service can use the time limit to make a time allocation. For example, the service can determine a plurality of time limits for a plurality of sub service providers to complete a transaction. The time allocation can be based on one or more service level agreements (SLAs) and subtracting an overhead factor. For example, if Service A was given 30 seconds to respond, the service A can allocate service B 25 seconds to respond. The 5 second difference allows time for network overhead as well as internal processing. If service A uses two services, service A can give 15 seconds to service B and 10 seconds to service D if service B normally takes longer to respond than service D. The time allocation can be adjusted. For example, if service A was given 20 seconds to respond, service A can adjust time limits for service B and service D accordingly.

FIG. 1 illustrates a block diagram of an example system for communication management. In an aspect, the system can comprise one or more clients (e.g., client 102) and/or one or more services (e.g., service 104a, service 104b, service 104c, service 104d). As an example, the one or more clients (e.g., client 102) can comprise a computer, a telephone, a smartphone, a mobile device, a laptop, a tablet, a set top box, a PDA, a network device, a server, and the like. In an aspect, a service can comprise a local or remote process, thread, service, server, application, and/or the like. As an example, a service can comprise network (e.g., Internet) connectivity services, media management (e.g., media server) services, content services (e.g., video gaming), content streaming services, broadband services, data routing services, telephone services, electronic commerce services, electronic funds transfer services, online transaction processing services, electronic data interchange services, or other network-related services. As an example, a service can be implemented and/or provided, at least in part, by a personal computer, a portable computer, a smartphone, a server, a router, a network device, a peer device, a switch, other common network node, and the like.

In an aspect, the one or more services and/or clients can be configured to communicate by one or more communication links with other local and/or remote services, such as data, devices, and files. In an aspect, a communication link between the one or more clients (e.g., client 102) and one or more services (e.g., service 104a, service 104b, service 104c, service 104d) or between two services can comprise a private and/or public network, such as the Internet, a local area (LAN) network, metropolitan area network (MAN), a wide area network (WAN) and the like. The communication link can comprise wireless links (e.g., radio frequency, satellite) and/or physical links (e.g., fiber optic cable, coaxial cable, Ethernet cable). In an aspect, the one or more clients (e.g., client 102) and one or more services (e.g., service 104a, service 104b, service 104c, service 104d) can be implemented as separate network entities or reside in a common location. For example, the communication link can comprise a local network, computer bus, computer interconnect, and/or the like. One or more services and/or clients can be implemented as network topology, such as tree, star, mesh, bus, line, ring, and the like.

The disclosed methods can be implemented in a public switched telephone network (PSTN) system, a public land mobile network (PLMN) system, a wireless distribution system, a wired or cable distribution system, a coaxial cable distribution system, an ultra-high frequency (UHF) or very high frequency (VHF) radio frequency system, a satellite or other extra-terrestrial system, a cellular distribution system, a power-line broadcast system, a fiber optic network, or any combinations of these systems and/or networks.

In one aspect, the one or more services can be configured to process requests from other services and/or clients. For example, the one or more services can be configured to determine one or more tasks based on a request. For example, the tasks can be configured to process, complete, and/or otherwise fulfill the request. In one aspect, the one or more services can be configured to delegate and/or otherwise provide the tasks to other services. As an example, a request can comprise requesting a content item in a specific format. As another example, a request can comprise coding or decoding a content item. As another example, a request can comprise routing a data block to a particular destination. As another example, a request can comprise processing an electronic commerce transaction. As another example, a request can comprise a digital rights management (DRM) license request. As another example, a request can comprise a travel scheduling request for hotel, flight, car rental, and the like. As another example, a request can comprise a user interface request to a multi-tier presentation service (e.g., Player Service). As another example, a request can comprise a multiplayer video game request.

In one aspect, the one or more services can be configured to determine one or more timeout parameters associated with requests, tasks, and/or the like. A timeout parameter can indicate the maximum allowed time for the interaction between a request initiator and a request receiver. In an aspect, one or more timeout parameters can be determined based on the type of service associated with requests, type of tasks associated with requests, number of services needed to process requests, properties of network connections (e.g., high bandwidth, low bandwidth, high latency, low latency), and other factors. In an aspect, one or more mathematical operations can be used to determine a timeout parameter (e.g., subtractions, additions, predetermined mathematical formulas). In an aspect, one or more timeout parameter can be determined based on a request processing history. For example, a request processing history can comprise a record of past network transactions. A record in a request processing history can comprise information on the type of a particular transaction and/or service, whether the particular transaction was successful, how long to complete the particular transaction, clients and services involved in the particular transaction, load on the participant clients and services during the transaction, network conditions (e.g., bandwidth, latency), network traffic during the particular transaction, and or the like. The service 104a can determine a first timeout parameter (e.g., 30 seconds) upon receiving a first request from the client 102.

In an aspect, one or more services can receive one or more timeout parameters from other services or one or more clients. As an example, the service 104a can receive a first request from the client 102. The client 102 can specify a first timeout parameter (e.g., 30 seconds) in the first request. In an aspect, upon receiving the first request (e.g., a request to complete a transaction in 30 seconds), the service 104a can identify a first task based on the first request. As an example, identifying the first task can comprise identifying one or more tasks to complete the first request. Additionally, one or more other services (e.g., service 104b, service 104c) can be identified to complete the transaction indicated in the first request. For example, certain services can be identified with pre-defined tasks and/or categories of tasks. For example, the service 104a can associate a second timeout parameter (e.g., 25 seconds) with the first task based on the first timeout parameter (e.g., 30 seconds) and the first task. In an aspect, the service 104a can subtract a network overhead time from the first timeout parameter to derive the second timeout parameter. In another aspect, the service 104a can determine the second timeout parameter based on an expected time to accomplish the task (e.g., or a portion thereof, or a subtask), backlog of the identified service, priority of the first task, and/or the like. The service 104a can provide the second timeout parameter (e.g., 25 seconds) with a second request to the service 104b to process the first task. For example, the second timeout parameter can be determined by subtracting a time value (e.g., 5 seconds) from the first timeout parameter. As an example, the time value can be an expected time delay associated with overhead of processing the first request (e.g., by the service 104a).

In an aspect, the first task can be processed. The first task can be configured to fulfill a first portion of the first request. For example, service 104b can process the first task according to the second timeout parameter (e.g., 25 seconds). In an aspect, in response to the first task exceeding the second timeout parameter, a notification indicative of the first request exceeding the first timeout parameter can be sent to the client 102. In an aspect, the notification can be sent before the first timeout parameter is exceeded. As an example, the notification can be a sound, a code, text, a message, or the like. In an aspect, the notification can be sent in the form of a custom HTTP header or field in a header.

In an aspect, the methods can further comprise identifying a second task based on at least one of the first task and the first request and associating a third timeout parameter with the second task. For example, a second task can be processed by the service 104c and the third timeout parameter (e.g., 10 seconds) can be associated with the second task. A third request can be sent to service 104c. The third request can comprise a request to process the second task based on the third timeout parameter. In an aspect, in response to the second task exceeding the third timeout parameter, a notification indicative of exceeding at least one of the first timeout parameter and the second timeout parameter can be sent to the client 102. In an aspect, the notification can be sent before the first timeout parameter is exceeded and/or the second timeout parameter is exceeded. For example, a notification can be sent (e.g., from the service 104c) to one or more other services, such as service 104b and service 104a that the third timeout parameter is exceeded or predicted to be exceeded. In response, service 104b can send a notification that the second timeout parameter is exceeded or predicted to be exceeded. Service 104a can send a notification that the first timeout parameter is exceeded or predicted to be exceeded to the client 102.

In an aspect, the disclosed methods can be used in any combination of components of FIG. 1. For example, the methods can be used only between the client 102 and the service 104a. In another aspect, any component of FIG. 1 can transmit a request to any other component of FIG. 1. For example, the client 102 can transmit a first request to the service 104a, and the service 104a can call one or more other services to process the first request (e.g., complete a task). For example, the service 104a can transmit a second request to the service 104b. As another example, the client 102 can transmit a request to the 104b directly. In turn, the service 104b can transmit one or more requests to a plurality of other services (not shown) and allocate each of the plurality of other services a respective amount of time to complete their respective tasks. If the one or more requests to the plurality of other services are issued in parallel, the time allocated to each of the plurality of other services can be a same number (e.g., 25 second). If the one or more requests to the plurality of other services are issued sequentially, then the service 104b can determine time allocation to the plurality of other services, such that total allocated time to the plurality of other services can be less than a certain number (e.g., 25 seconds).

Figure 2:
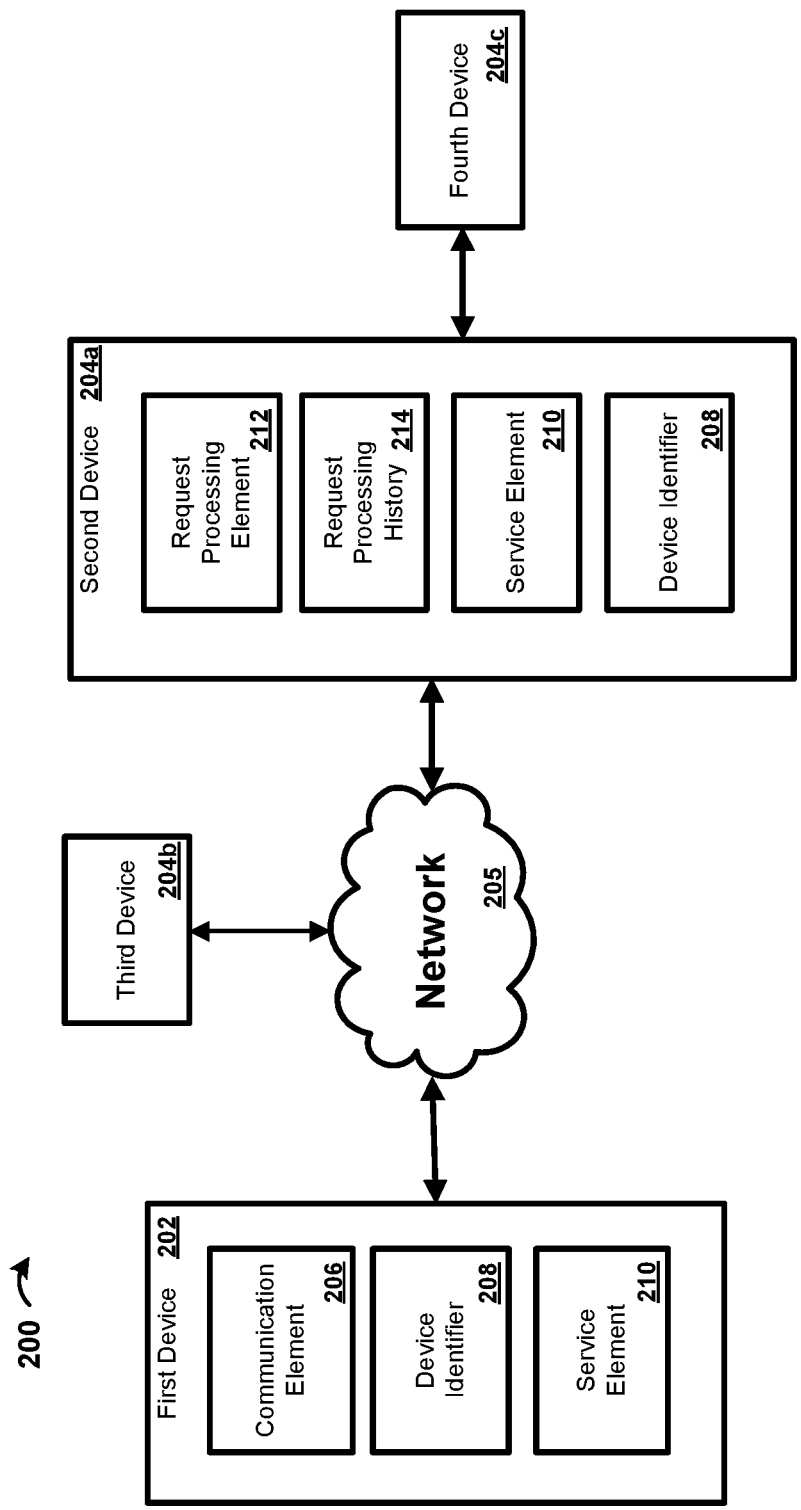
FIG. 2 is a block diagram of an exemplary system in which the present methods and systems can operate.

FIG. 2 illustrates various aspects of an example system 200 for communication management. In one aspect, the system 200 can comprise a plurality of devices, for example, a first device 202, a second device 204a, a third device 204b, and the fourth device 204c. As an example, the plurality of devices can comprise electronic devices such as computers, smartphones, laptops, tablets, set top boxes, display devices, servers, network devices, and the like. The plurality of devices (e.g., first device 204, second device 204a, third device 204b, fourth device 204c) can be implemented as separate network entities or reside in a common location. The plurality of devices can communicate via network 205. The network 205 can comprise a private and/or public network, such as the Internet or a local area network. Other forms of communications can be used such as wired and wireless telecommunication channels.

In one aspect, the network 205 can comprise a packet switched network (e.g., internet protocol based network), a non-packet switched network (e.g., quadrature amplitude modulation based network), and/or the like. The network 205 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 205 can be configured to provide communication from telephone, cellular, modem, and/or other electronic devices to and throughout the system 200.

As an example, the first device 202 can be configured as a client. In an aspect, the first device 202 can comprise a communication element 206 for providing an interface to a user to interact with the first device 202 and/or one or more of the plurality of devices (e.g., second device 204a, third device 204b). The communication element 206 can be any interface for presenting and/or receiving information to/from a user. An example interface may be communication interface such as a web browser (e.g., Internet Explorer, Mozilla Firefox, Google Chrome, Safari, or the like). As another example, the communication element 206 can request or query various files from a local source and/or a remote source. As a further example, the communication element 206 can transmit data to a local or remote device (e.g., second device 204a, third device 204b). As an example, the communication element can 206 can be used to transmit a request for a service (e.g., content streaming service) to one or more of the plurality of devices (e.g., second device 204a).

In an aspect, the first device 202 can be associated with a user identifier or device identifier 208. As an example, the device identifier 208 can be any identifier, token, character, string, or the like, for differentiating one user or device (e.g., first device 202) from another user or device. In a further aspect, the device identifier 208 can identify a user or user device as belonging to a particular class of users or user devices. As a further example, the device identifier 208 can comprise information relating to the user device such as a manufacturer, a model or type of device, a service provider associated with the first device 202, a state of the first device 202, a locator, and/or a label or classifier. Other information can be represented by the device identifier 208.

In an aspect, the first device 202 can be associated with a service element 210. As an example, the service element 210 can comprise an identification of a service provider associated with the first device 202 and/or with the class of first device 202. The class of the first device 202 can be related to a type of device, capability of device, type of service being provided, and/or a level of service (e.g., business class, service tier, service package, etc.). As an example, the service element 210 can comprise information relating to or provided by a communication service provider (e.g., content provider) that is providing or enabling data flow such as communication services to the first device 202. As a further example, the service element 210 can comprise information relating to a preferred service provider for one or more particular services relating to the first device 202. Other information can be represented by the service element 210. As an example, service element 210 can be used to determine a service provider for a particular service request.

In an aspect, the second device 204a, the third device 204b, and the fourth device 204c can be configured as servers. As an example, the second device 204a and the third device 204b can communicate with the first device 202 for providing data and/or services. As an example, the second device 204a and/or the third device 204b can provide services such media management services, content services, streaming services, coding/decoding services, electronic commerce services, or other network-related services. In an aspect, the second device 204a can allow the first device 202 to interact with remote resources such as data, devices, and files, for example, the fourth device 204c.

In an aspect, the second device 204a, the third device 204b, and the fourth device 204c can each comprise a respective request processing element. For example, the second device 204a can be associated with a request processing element 212. As an example, the request processing element 212 can process a request from another device or network component, for example, first device 202, third device 204b, and/or the fourth device 204c. In an aspect, the request processing element 212 can determine one or more tasks associated with a received request (e.g., a request received from the first device 202). In another aspect, the request processing element 212 can identify one or more services to process one or more portions of a received request. In another aspect, the request processing element 212 can determine one or more timeout parameters associated with requests and/or tasks.

In an aspect, one or more of the second device 204a, the third device 204b, and the fourth device 204c can be associated with one or more request processing history databases, such a request processing history 214. The request processing history databases can be used to determine one or more timeout parameters associated with requests and/or tasks. For example, the second device 204a can be associated with a request processing history 214. In an aspect, the request processing history 214 can allow the use of historical information to determine, estimate, and/or otherwise predict appropriate values for timeout parameters. For example, a request and/or task can be compared to historical information in the request processing history 214 to determine an appropriate amount of time for a timeout parameter. In an aspect, a request processing history 214 can comprise a record of past network transactions. A record in the request processing history 214 can represent a particular request and/or transaction. For example, the request can comprise information on the type of a transaction and/or a service (e.g., content service, coding service, electronic commerce service, gaming service), whether a particular transaction was successful, how long to complete a particular transaction, clients and services involved in a particular transaction, load on involved clients and services during a particular transaction, network condition (e.g., bandwidth, latency) and network traffic during a particular transaction, and/or the like.

Figure 3:
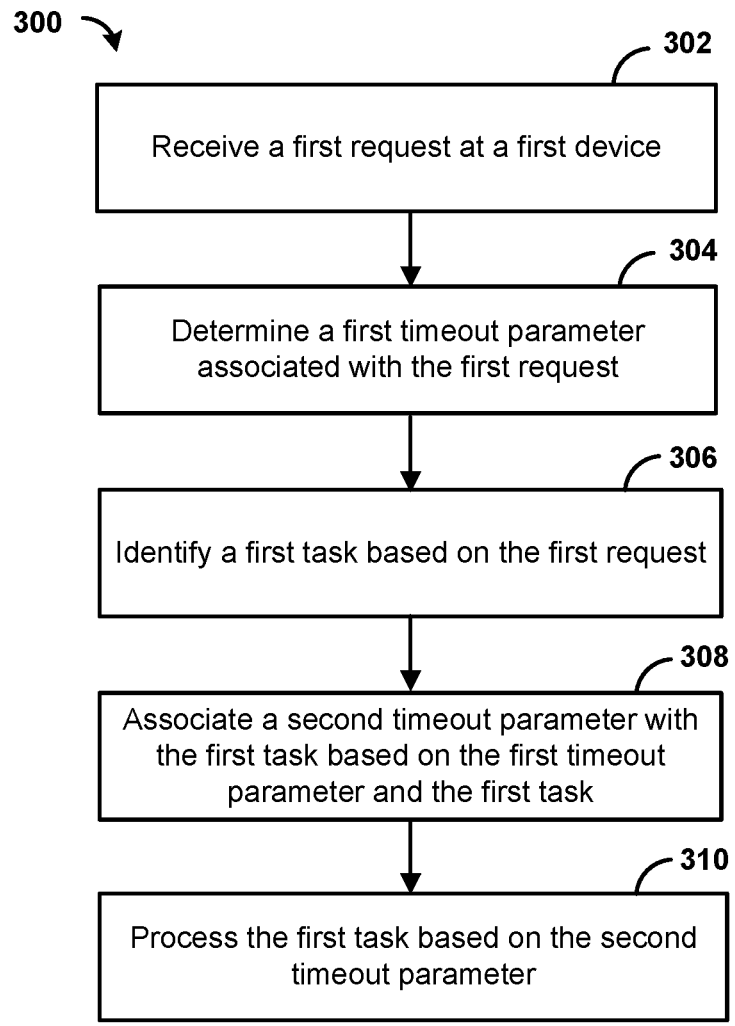
FIG. 3 is a flowchart illustrating an example method.

FIG. 3 is a flowchart illustrating an example 300 method. At step 302, a first request can be received (e.g., by a first device, service 104a). The first request can comprise a request to initiate a transaction (e.g., network transaction). The request can be received from a service, a client, a device, or another component in the network. A service can comprise a local or remote process, thread, service, server, application, and/or the like. For example, a service provider (e.g., first device, service 104a) can receive a first request from a client (e.g., client 102). In an aspect, the first request can comprise a request for a service and an identity of the service requestor (e.g., device identifier 108). As an example, the first request can comprise a request for a content service, a streaming service, a mobile commerce service, an electronic funds transfer service, an Internet marketing service, an online transaction processing service, an electronic data interchange service, and/or the like.

At step 304, a first timeout parameter associated with the first request can be determined (e.g., by a first device, service 104a). A timeout parameter can indicate the maximum allowed time for the interaction between the first request initiator (e.g., client 102) and the first request receiver (e.g., first device, service 104a). In an aspect, the first request can comprise a first timeout parameter (e.g., 30 seconds). In another aspect, the first timeout parameter can be determined at the first request receiver (e.g., first device, service 104a) upon receiving the first request. In an aspect, the first timeout parameter can be determined based on the type of requested service, whether one or more other services are needed to process the first request, properties of network connections (e.g., high bandwidth, low bandwidth, high latency, low latency) associated with the first request initiator and one or more first request processors, and other factors. In an aspect, the service 104a and/or first device can determine the first timeout parameter based on a request processing history. For example, a request processing history can comprise a record of past network transactions. In an aspect, a record in the request processing history can represent a particular request and/or transaction. A record can comprise information on the type of a particular transaction and/or service, whether the particular transaction was successful, how long to complete the particular transaction, clients and services involved in the particular transaction, load on the participant clients and services during the transaction, network conditions (e.g., bandwidth, latency) and network traffic during the particular transaction, and or the like.

At step 306, a first task can be identified (e.g., by a first device, service 104a) based on the first request. In an aspect, the service and/or device that receives the first request can identify a first task based on the first request. For example, service 104a and/or the first device can identify a first task and determine that a second service (e.g., service 104b) and/or second device can perform the first task. In an aspect, the first task can be configured to fulfill a first portion of the first request. In the scenario of content streaming service, the first task can comprise encoding requested content streams content and encapsulating the encoded content in a format suitable for delivery.

At step 308, a second timeout parameter can be associated with the first task based on the first timeout parameter and the first task (e.g., by a first device, service 104a). In an aspect, when the service 104a and/or first device identifies the first task, the service 104a and/or first device can associate a second timeout parameter (e.g., 25 seconds) with the first task based on the first timeout parameter (e.g., 30 seconds) and the first task. In an aspect, the second timeout parameter can be determined by one or more predefined formula (e.g., addition, subtraction, multiplication, division, and other mathematical operations) and/or by comparison to historical information. As a specific example, the second timeout parameter can be determined by subtracting a time value (e.g., 5 seconds) from the first timeout parameter. As an example, the time value can be an expected time delay associated with overhead of processing the first request. For example, the time delay can comprise time delay in transmitting the first request. As another example, the time delay can comprise identifying one or more services to process the first task. As another example, the time delay can comprise determining current network conditions such as bandwidth, latency, loads, and/or the like. As another example, the time can comprise accessing a request processing history.

At step 310, the first task can be processed based on the second timeout parameter. Processing the first task can comprise fulfilling the first task, for example, by performing a calculation, retrieving information, converting data, sending data, and/or the like. For example, the first task can be performed at the first device, such as by a service running on the first device. As another example, the first task can be processed at another device, such as a second device.

Processing the first task can comprise sending the second timeout parameter with a second request to process the first task. The first device (e.g., service 104*a*) can send the second timeout parameter (e.g., 25 seconds) with a second request to the second device or to a service (e.g., first service) running on the first device to process the first task. The first device and/or second device can process the first task according to the second timeout parameter (e.g., 25 seconds). In an aspect, in response to the first task exceeding or a prediction of exceeding the second timeout parameter, a notification indicative of the first request exceeding or being predicted to exceed the first timeout parameter can be sent. For example, the notification can be sent by the first device and/or second device to the client (e.g., client 102), device (e.g., first device), and/or service that sent the first request. In an aspect, the notification can be sent before the first timeout parameter is exceeded. The notification can be transmitted to the client, device, and/or service before the connection between the client 102 and the device and/or service 104*a* is terminated. As an example, the notification can be a sound, a code, text, a message, or the like. In an aspect, the notification can be sent in the form of a custom HTTP header or field in a header.

In an aspect, a second task can be identified based on at least one of the first task and the first request. In the scenario of content streaming service, the first task can comprise encoding requested content streams and encapsulating the encoded content in a format suitable for delivery. In an aspect, the second task can comprise identifying coding format suitable for a content requestor (e.g., client 102). In another aspect, the second task can comprise distributing the encapsulated content to the content requestor (e.g., client 102).

A third timeout parameter can be associated with the second task. In an aspect, the first device, second device (e.g., service 104*b*), and/or a service running on the first device or second device can determine a third timeout parameter (e.g., 10 seconds) associated with the identified second task. In another aspect, the service and/or device that processes the second task (e.g., the service 104*c*) can determine a third timeout parameter (e.g., 10 seconds) associated with the second task.

It can be determined whether the second task exceeded the third timeout parameter. In an aspect, the service (e.g., service 104*c*) and/or device (e.g., first device, second device, third device) that processes the second task can determine that processing the second task would (e.g., is predicted to) exceed the third timeout parameter (e.g., 10 seconds). In an aspect, the determination can be made based on one or more of the progress of processing the second task, the time elapsed to process the second task, current network conditions, current load on the service and/or device that processes the second task (e.g., service 104*c*), and the like. In another aspect, the determination can be made by comparing the current transaction with one or more similar transactions in a request processing history.

A notification indicative of exceeding at least one of the first timeout parameter and the second timeout parameter can be sent in response to the second task exceeding the third timeout parameter. For example, in response to the second task exceeding or being predicted to exceed the third timeout parameter (e.g., 10 seconds), a notification indicative of exceeding or being predicted to exceed at least one of the first timeout parameter and the second timeout parameter can be sent. For example, a notification that the second task exceeds or is predicted to exceed the third timeout parameter can be determined by the service 104*c* and/or third device and transmitted to service 104*b* and/or second device. In turn, the service 104*b* and/or second device can send a notification indicative of exceeding the second timeout parameter and transmit the notification to service 104*a* and/or first device. The service 104*a* can send a notification to the client 102 indicative of exceeding or the first timeout parameter. As an example, the notification can be a sound, a code, text, a message, or the like. The notification indicative of exceeding or being predicted to exceed at least one of the first timeout parameter and the second timeout parameter can be sent in the form of a custom HTTP header or field in a header.

Figure 4:
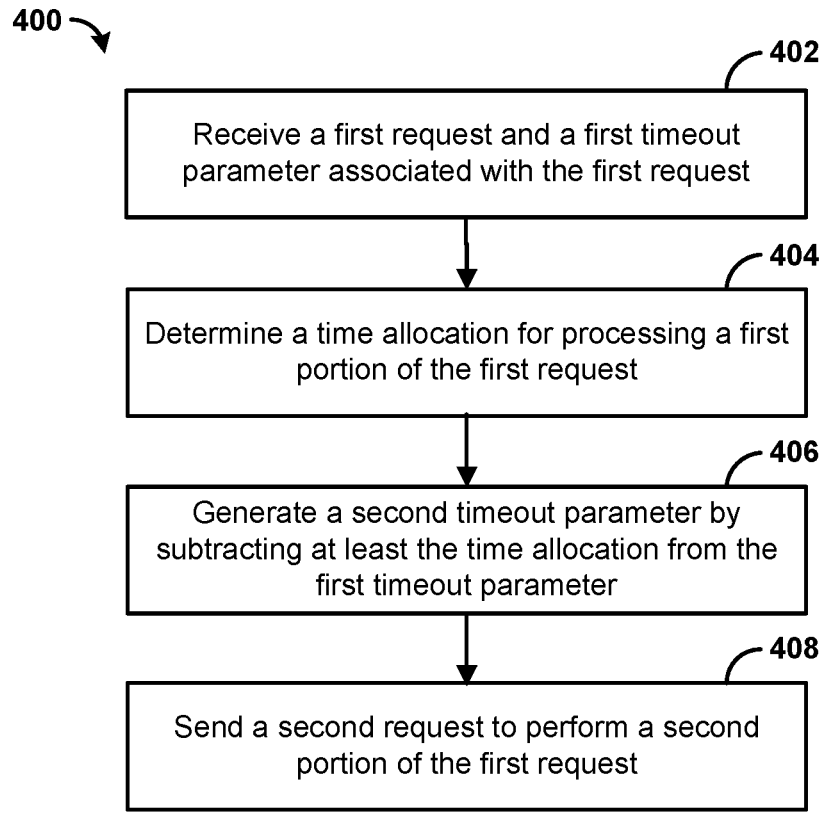
FIG. 4 is a flowchart illustrating another example method.

FIG. 4 is a flowchart illustrating an example method 400. At step 402, a first request and a first timeout parameter associated with the first request can be received. The first request can comprise a request to complete a task or initiate a transaction (e.g., network transaction). The request can be received from a service, a client, or another component in the network. A service can comprise a local or remote process, thread, service, server, application, and/or the like. For example, the first request can comprise a first timeout parameter. As an example, the first timeout parameter can be 3 seconds, 5 seconds, 20 seconds, 30 seconds or any value appropriate for a particular application. In an aspect, the first timeout parameter can be a predefined timeout parameter, or a timeout parameter dynamically determined when the first request is initiated. For example, the first timeout parameter can be determined by the type of service associated with the first request, current network conditions associated with the first request initiator and/or first requestor receiver, processing history related to the type of service, and/or the like.

In an aspect, the first request can be and/or comprise a request to perform a subtask of a third request. For example, the client 102 can receive a third request from another client or a service. The client 102 can determine a subtask of the task and a timeout parameter associated with the subtask. The client 102 can transmit the first request to a service (e.g., 104*b*) or another client to perform the determined subtask. In an aspect, the first timeout parameter can be based on a third timeout parameter associated with the third request. For example, if the third timeout parameter associated with the third request specifies 40 seconds to process the third request, the client 102 can allocate 30 seconds as the first timeout parameter to the process the subtask of the third request. The first timeout parameter can be transmitted along with the first request.

At step 404, a time allocation for processing a first portion of the first request can be determined. As an example, if the time allocation to process the first request is 30 seconds, the time allocation for processing a first portion of the first request can be 20 seconds. In an aspect, the time allocation for processing a first portion of the first request can be determined based on, the services (e.g., 104*a*, 104*b*, 104*c*) that participate in the processing the first portion of the first request, the number of services, hardware performance of the services (e.g., CPU speed, hardware load, memory, etc.) that participate in the processing the first portion of the first request, type of service associated with the first request (e.g., content service, electronic funds transfer, web service, etc.), type of network connection (e.g., bandwidth, latency, etc.) associated with the first request, current network traffic (e.g., high, low), average response time of the one or more services that participate in the processing the first portion of the first request, whether a remote source is needed, and/or other factors.

In an aspect, determining the time allocation for processing the first portion of the first request can comprise measuring a time elapsed for processing the first request. For example, processing the first request can comprise identifying a service to process a first portion of the first request and any network overhead in transmitting a request to processing the first portion of the first request. The time for processing the first request can be measured. If 10 seconds has elapsed and the allocated time to process the first request is 30 seconds, the time allocation for processing the first portion of the first request cannot be greater than 20 seconds.

In an aspect, the time allocation can be determined via accessing a request processing history. For example, a request processing history can comprise a record of past network transactions. In an aspect, a record in the request processing history can represent a particular request and/or transaction. A record can comprise information on the type of a transaction and/or service (e.g., electronic commerce transaction, electronic funds transfer transaction, etc.), whether the transaction was successful, how long the transaction took to complete, clients and services involved in the transaction, load on the participant clients and services during the transaction, network condition (e.g., bandwidth, latency), network traffic during the transaction, and/or the like.

In an aspect, at least a part of the first portion of the first request can be processed. As an example, the first request can comprise a content streaming request. Processing the at least a part of the first portion of the first request can comprise encoding requested content streams and encapsulating the encoded content in a format suitable for delivery. At least a part of the first portion of the first request first request can be processed at the service 104a.

It can be determined whether the processing at least the part of the first portion of the first request is predicted to exceed the first timeout parameter. For example, when processing at least the part of the first portion of the first request is predicted to exceed the time allocation previously determined (e.g., 15 seconds), service 104a can predict the overall processing time for the first request can exceed the first timeout parameter (e.g., 30 seconds).

A notification indicative of exceeding the first timeout parameter can be sent. In an aspect, the notification can be sent before the first timeout parameter is exceeded. For example, the notification can be sent when it is determined that the processing at least the part of the first portion of the first request is predicted to exceed the first timeout parameter. The notification can be transmitted from the service 104a to the client 102 before the connection between the client 102 and the service 104a is terminated. As an example, the notification can be a sound, a code, text, a message, or the like. As an example, the notification can be sent in the form of a custom HTTP header or field in a header.

At step 406, a second timeout parameter can be determined. For example, the second timeout parameter can be determined by one or more predefined formula (e.g., addition, subtraction, multiplication, division, and other mathematical operations), comparison to historical information, determination of current network conditions and/or device conditions, and/or the like. For example, the second timeout parameter can be determined by subtracting at least the time allocation from the first timeout parameter. As a further example, the second timeout parameter can be determined by subtracting, from the first timeout parameter, the determined time allocation. In an aspect, when the service 104a identifies that service 104b can process a second portion of the first request. In the scenario of content streaming service, processing the second portion of the first request can comprise distributing processed (e.g., encoded, encapsulated) content to a content requestor (e.g., client 102). A second timeout parameter (e.g., 10 seconds) can be associated with the processing of the second portion of the first request. In an aspect, the second timeout parameter can be determined by subtracting at least the time allocation (e.g., 15 seconds) from the first timeout parameter. Other time values (e.g., one or more other time values) can be subtracted. As an example, the other time value can be an expected time delay associated with overhead of processing the first request. For example, the time delay can comprise time delay in transmitting the first request, determining the service to process the first request, determining the time allocation for processing the first portion of the first request, determining the time allocation for processing the second portion of the first request, and/or the like. The second timeout parameter can be determined by the service 104a.

At step 408, a second request can be sent to perform a second portion of the first request. As an example, the service 104a can send the second request to the service 104b to process the second portion of the first request. The second timeout parameter (e.g., 10 seconds) can be sent to the service 104b along with the second request. In an aspect, the second portion of the first request can be processed when the second request is received, for example, by the service 104b.

In an aspect, a first notification indicative of the second request exceeding the second timeout parameter can be received. As an example, the service 104b can determine that the processing of the second request is predicted to exceed the second timeout parameter, and the service 104b can generate a first notification and transmit to the service 104a. The first notification can be transmitted to the client 102 before the connection between the service 104a and the client (e.g., client 102) is terminated. In an aspect, the second notification can be determined by comparing current transaction with one or more similar transactions in a request processing history.

A second notification indicative of exceeding the first timeout parameter can be sent in response to receiving the first notification. Upon receiving the first notification, the service 104a can generate a second notification indicative of exceeding the first timeout parameter. The first notification and/or the second notification can be transmitted to the client 102 before the connection between the service 104a and the client (e.g., client 102) is terminated. In an aspect, the second notification can be sent by comparing the current transaction with one or more similar transactions in a request processing history.

In the event of failure, the notifications (e.g., first notification, second notification can notify a client or a service of the status (e.g., completed, not completed, failed, unable to complete within timeout parameter) of a request (e.g., first request, second request). In another aspect, the client that initiates a service request can determine whether to use a different timeout parameter in a subsequent request if a previous request is not completed within a specific timeout parameter.

Figure 5:
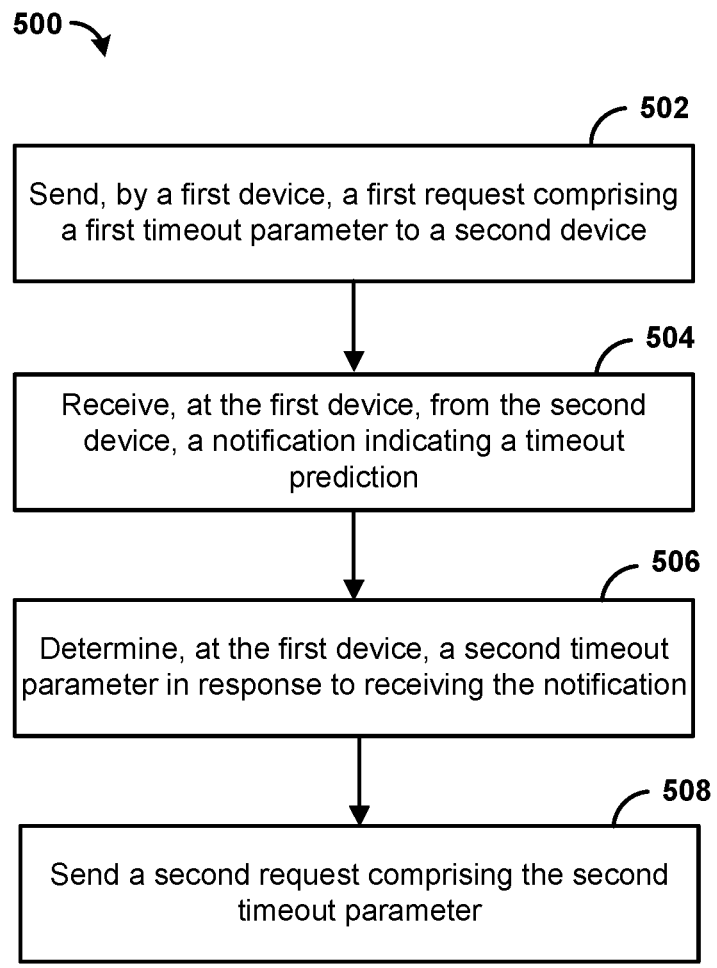
FIG. 5 is a flowchart illustrating yet another example method.

FIG. 5 is a flowchart illustrating an example method 500. At step 502, a first request with a first timeout parameter can be sent from a first device to a second device. The first request can comprise a request to complete a task and/or initiate a transaction (e.g., a network transaction). The request can be received from a service, a client, device, and/or another component in the network. For example, a device can comprise one or more services running on the device. A client can comprise a device requesting any type of service, such as fulfillment of as specified task or series of tasks. As an example, the first request can be received from the client 102 at the service 104*a*. The first timeout parameter (e.g., 30 seconds) can be sent from the client 102 to the service 104*a*.

In an aspect, an estimated time to complete processing the first request can be determined at the second device. The estimated time can be determined by comparing the current transaction (e.g., type of service, network conditions) with one or more similar transactions in a request processing history. In another aspect, determining the estimated time can comprise determining the number of services involved to process the first request and/or estimated processing time for one or more services to process the first request. In another aspect, determining the estimated time can comprise determining network overhead for transmitting data associated with processing the first request among the one or more services.

In an aspect, a timeout prediction can be determined based on the first timeout parameter and the time estimation for processing the first request. For example, the second device can make a timeout prediction that the first timeout parameter will be exceeded. In an aspect, the second device (e.g., service 104*a*) can be configured to fulfill the first request by delegating a task to a third device and/or a service, such as service 104*b*. In an aspect, the task can be sent to the third device and/or service (e.g., service 104*b*) with a third timeout parameter determined by the second device. The third timeout parameter can be determined by subtracting time from the first timeout parameter based on overhead, network load, processing load, processing time, task complexity, backlog, scheduled events, and/or the like. A timeout prediction can be determined based on a respective estimated time for the second device (e.g., service 104*b*) to process the task exceeding or being predicted to exceed the third timeout parameter.

At step 504, a notification indicating a timeout prediction based on the first timeout parameter can be received at the first device from the second device. For example, the second device (e.g., service 104*a*) can be configured to send the notification to a client (e.g., client 102) before the first timeout parameter is exceeded. In an aspect, the second device (e.g., service 104*a*) can be configured to fulfill the first request by delegating a task to a device and/or service, such as service 104*b*. In an aspect, the task can be sent to the device and/or service with the third timeout parameter. A notification can be sent based on the service exceeding the third timeout parameter. In an aspect, the notification can comprise an estimated time to complete processing the first request.

At step 506, a second timeout parameter can be determined, at the first device, in response to receiving the notification. For example, upon receiving the notification at step 508, the client that initiated the first request (e.g., client 102) can determine that the first timeout parameter is not adequate to process the first request. For example, the second timeout parameter can be based on the estimated time to complete processing the task from the notification. The second timeout parameter can be increased from the first timeout parameter to accommodate the current bandwidth, processing load, and/or the like of the second device.

In an aspect, the client (e.g., client 102) can identify a third device or service (e.g., service 104*d*) to send a second request to the second device with the second timeout parameter. As an example, the third device (e.g., service 104*d*) can have more hardware resources (e.g., faster processing power, less load, more memory, etc.) than the second device (e.g., service 104*a*). The first timeout parameter can be different than the second timeout parameter. For example, if the third device or service comprises a faster processor than the second device or service, the second timeout parameter can be less than the first timeout parameter. As another example, if the third device comprises a similar processor compared to the second device or service, the second timeout parameter can be greater than the first timeout parameter. In an aspect, the second timeout parameter can be determined based on one or more similar transactions stored in a request processing history.

At step 508, a second request can be sent (e.g., in response to receiving the notification). For example, the second request can be sent to the identified device (e.g., third device) and/or service. The second request can comprise the second timeout parameter. As another example, the second request can be sent to the second device (e.g., after sending the first request and receiving the notification). The second request can be the same as the first request with the second timeout parameter instead of the first timeout parameter.

Figure 6:
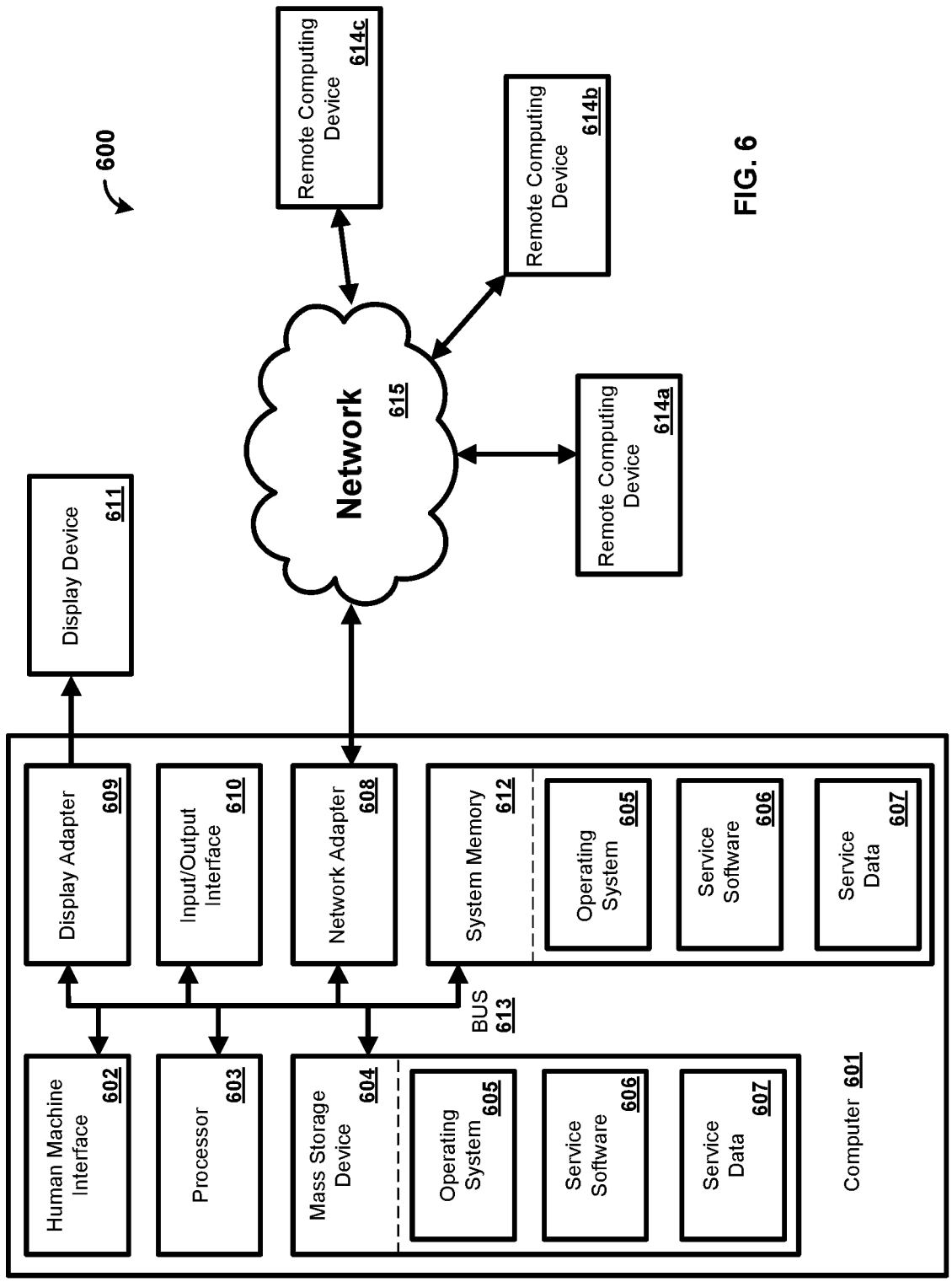
FIG. 6 is a block diagram illustrating an example computing device in which the present methods and systems can operate.

FIG. 6 is a block diagram illustrating an exemplary operating environment for performing the disclosed methods. In an exemplary aspect, the methods and systems of the present disclosure can be implemented on computer 601 as illustrated in FIG. 6 and described below. By way of example, one or more components shown in FIG. 2 can be a computer 601 as illustrated in FIG. 6. Similarly, the methods and systems disclosed can utilize one or more computing devices to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. In one aspect, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 613, and all buses specified in this description can also be implemented over a wired or wireless network connection and each of the subsystems, including the one or more processors 603, a mass storage device 604, an operating system 605, service software 606, service data 607, a network adapter 608, system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as service data 607, and/or program modules, such as operating system 605 and service software 606, that are immediately accessible to and/or are presently operated on by the one or more processors 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and service software 606. Each of the operating system 605 and service software 606 (or some combination thereof) can comprise elements of the programming and the service software 606. Service data 607 can also be stored on the mass storage device 604. Service data 607 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices, such as gloves, and other body coverings, and the like. These and other input devices can be connected to the one or more processors 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components, such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 605 are illustrated herein as discrete blocks, although it is recognized that such programs and components reside at various times in different storage components of the computer 601, and are executed by the data processor(s) of the computer. An implementation of service software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a first device, a first request, wherein a first timeout parameter is associated with the first request;
   determining, based on the first timeout parameter, a time allocation for processing a first portion of the first request;
   determining, based on the time allocation, a second timeout parameter by subtracting at least the time allocation from the first timeout parameter; and
   sending, to a second device:
      a second request to perform at least a second portion of the first request, and
      the second timeout parameter.

2. The method of claim 1, further comprising receiving, based on a determination that the second device is predicted to exceed the second timeout parameter while performing the at least the second portion of the first request, a notification that indicates that the second device is predicted to exceed the second timeout parameter.

3. The method of claim 1, further comprising:
   determining, by the second device, based on a prediction to exceed the second timeout parameter while performing the at least the second portion of the first request, a third timeout parameter; and
   sending, by the second device, to a third device:
      a third request to perform the at least the second portion of the first request; and
      the third timeout parameter.

4. The method of claim 1, further comprising receiving, based on the second device exceeding the second timeout parameter while performing the at least the second portion of the first request, a notification that indicates that the second device exceeded the second timeout parameter.

5. The method of claim 1, further comprising:
   determining, by the second device, based on the second portion of the first request, a third timeout parameter; and
   sending, by the second device, to a third device:
      a third request to perform at least a third portion of the first request; and
      the third timeout parameter.

6. The method of claim 1, further comprising:
   determining, based on the first portion of the first request, the second portion of the first request; and
   associating the second timeout parameter with the second portion of the first request.

7. The method of claim 1, wherein the first request is associated with a computing task, wherein the second portion of the first request comprises the computing task, and wherein the time allocation further comprises an expected time delay associated with an overhead of a system comprising the first device.

8. The method of claim 1, further comprising determining the first timeout parameter.

9. The method of claim 8, wherein the first timeout parameter is determined based on one or more of a type of service associated with the first request, a current network condition, a processing history associated with the type of service, and a time elapsed for processing a portion of the first portion of the first request.

10. An apparatus, comprising:
    one or more processors; and
    memory storing processor-executable instructions that, when executed by the one or more processors, cause the apparatus to:
       receive a first request, wherein a first timeout parameter is associated with the first request;
       determine, based on the first timeout parameter, a time allocation for processing a first portion of the first request;
       determine, based on the time allocation, a second timeout parameter by subtracting at least the time allocation from the first timeout parameter; and
       send, to a second device:
          a second request to perform at least a second portion of the first request, and
          the second timeout parameter.

11. The apparatus of claim 10, wherein the processor-executable instructions, when executed by the one or more processors, further cause the apparatus to receive, based on a determination that the second device is predicted to exceed the second timeout parameter while performing the at least the second portion of the first request, a notification that indicates that the second device is predicted to exceed the second timeout parameter.

12. The apparatus of claim 10, wherein the processor-executable instructions, when executed by the one or more processors, further cause the apparatus to:
    determine based on a prediction to exceed the second timeout parameter while performing the at least the second portion of the first request, a third timeout parameter; and
    send to a third device:
       a third request to perform the at least the second portion of the first request; and
       the third timeout parameter.

13. The apparatus of claim 10, wherein the processor-executable instructions, when executed by the one or more processors, further cause the apparatus to receive, based on the second device exceeding the second timeout parameter while performing the at least the second portion of the first request, a notification that indicates that the second device exceeded the second timeout parameter.

14. The apparatus of claim 10, wherein the processor-executable instructions, when executed by the one or more processors, further cause the apparatus to:
    determine, based on the first portion of the first request, the second portion of the first request; and
    associate the second timeout parameter with the second portion of the first request.

15. The apparatus of claim 10, wherein the first request is associated with a computing task, wherein the second portion of the first request comprises the computing task, and wherein the time allocation further comprises an expected time delay.

16. The apparatus of claim 10, wherein the processor-executable instructions, when executed by the one or more processors, further cause the apparatus to determine the first timeout parameter.

17. The apparatus of claim 16, wherein the first timeout parameter is determined based on one or more of a type of service associated with the first request, a current network condition, a processing history associated with the type of service, and a time elapsed for processing a portion of the first portion of the first request.

18. One or more non-transitory computer-readable media storing processor-executable instructions that, when executed by at least one processor, cause the at least one processor to:
    receive a first request, wherein a first timeout parameter is associated with the first request;
    determine, based on the first timeout parameter, a time allocation for processing a first portion of the first request;
    determine, based on the time allocation, a second timeout parameter by subtracting at least the time allocation from the first timeout parameter; and
    send, to a second device: a second request to perform at least a second portion of the first request, and the second timeout parameter.

19. The one or more non-transitory computer-readable media of claim 18, wherein the processor-executable instructions, when executed by the at least one processor, further cause the at least one processor to receive, based on a determination that the second device is predicted to exceed the second timeout parameter while performing the at least the second portion of the first request, a notification that indicates that the second device is predicted to exceed the second timeout parameter.

20. The one or more non-transitory computer-readable media of claim 18, wherein the processor-executable instructions, when executed by the at least one processor, further cause the at least one processor to:
    determine based on a prediction to exceed the second timeout parameter while performing the at least the second portion of the first request, a third timeout parameter; and send to a third device: a third request to perform the at least the second portion of the first request; and the third timeout parameter.

21. The one or more non-transitory computer-readable media of claim 18, wherein the processor-executable instructions, when executed by the at least one processor, further cause the at least one processor to receive, based on the second device exceeding the second timeout parameter while performing the at least the second portion of the first request, a notification that indicates that the second device exceeded the second timeout parameter.

22. The one or more non-transitory computer-readable media of claim 18, wherein the processor-executable instructions, when executed by the at least one processor, further cause the at least one processor to:
    determine, based on the second portion of the first request, a third timeout parameter; and send to a third device: a third request to perform at least a third portion of the first request; and the third timeout parameter.

23. The one or more non-transitory computer-readable media of claim 18, wherein the processor-executable instructions, when executed by the at least one processor, further cause the at least one processor to:
    determine, based on the first portion of the first request, the second portion of the first request; and associate the second timeout parameter with the second portion of the first request.

24. The one or more non-transitory computer-readable media of claim 18, wherein the first request is associated with a computing task, wherein the second portion of the first request comprises the computing task, and wherein the time allocation further comprises an expected time delay associated with an overhead of a system.

25. The one or more non-transitory computer-readable media of claim 18, wherein the processor-executable instructions, when executed by the at least one processor, further cause the at least one processor to determine the first timeout parameter.

26. The one or more non-transitory computer-readable media of claim 25, wherein the first timeout parameter is determined based on one or more of a type of service associated with the first request, a current network condition, a processing history associated with the type of service, and a time elapsed for processing a portion of the first portion of the first request.

* * * * *